US012735325B2

(12) United States Patent
Cucchiella et al.

(10) Patent No.: US 12,735,325 B2
(45) Date of Patent: Sep. 15, 2026

(54) PURGE GAS CONDITIONING OF NH3 PLANTS

(71) Applicant: Stamicarbon B.V., Sittard (NL)

(72) Inventors: Barbara Cucchiella, Gulpen (NL); Joey Dobree, Maastricht (NL); Mahal Patel, Sittard (NL); Michael Mattis Carlos Verheijen, Herten (NL); Rolf Sybren Postma, Swalmen (NL)

(73) Assignee: Stamicarbon B.V., Sittard (NL)

( * ) Notice: Subject to any disclaimer, the term of this patent is extended or adjusted under 35 U.S.C. 154(b) by 0 days.

(21) Appl. No.: 18/996,733

(22) PCT Filed: Mar. 28, 2024

(86) PCT No.: PCT/NL2024/050155
§ 371 (c)(1),
(2) Date: Jan. 17, 2025

(87) PCT Pub. No.: WO2024/205408
PCT Pub. Date: Oct. 3, 2024

(65) Prior Publication Data

US 2025/0256975 A1 Aug. 14, 2025

(30) Foreign Application Priority Data

Mar. 30, 2023 (EP) .................................... 23165617

(51) Int. Cl.
*C01C 1/04* (2006.01)
*C01B 3/025* (2026.01)
(Continued)

(52) U.S. Cl.
CPC ............ *C01C 1/0476* (2013.01); *C01B 3/025* (2013.01); *C01B 3/501* (2013.01); *C01B 3/52* (2013.01);
(Continued)

(58) Field of Classification Search
CPC ..... C01C 1/0476; C01C 1/0405; C01B 3/025; C01B 3/501; C01B 3/52;
(Continued)

(56) References Cited

U.S. PATENT DOCUMENTS 4,180,553 A * 12/1979 Null ...................... C01C 1/0476 95/55
4,591,365 A * 5/1986 Burr ........................ C01B 3/501 95/55
(Continued)

FOREIGN PATENT DOCUMENTS

CN 104560201 B 7/2017
CN 114588749 A 6/2022
WO 2022207386 A1 10/2022

OTHER PUBLICATIONS

Notification of Transmittal of the International Preliminary Report on Patentability mailed Jan. 2, 2025 for the corresponding PCT International Patent Application No. PCT/NL2024/050155; 7 pages.
(Continued)

*Primary Examiner* — Daniel C. McCracken
*Assistant Examiner* — Starfari Teshawn McClain
(74) *Attorney, Agent, or Firm* — Leason Ellis LLP

(57) ABSTRACT

Embodiments of the disclosure pertain to the conditioning of the purge gas stream in an $NH_3$ synthesis plant comprising a water electrolysis unit to produce a $H_2$ stream, ammonia synthesis loop, and a treatment section for treating purge gas at 10-70 bar(a) using scrubbing and membrane separation.

22 Claims, 1 Drawing Sheet

(51) Int. Cl.
*C01B 3/501* (2026.01)
*C01B 3/52* (2006.01)
*C25B 1/04* (2021.01)

(52) U.S. Cl.
CPC ........ *C25B 1/04* (2013.01); *C01B 2203/0405* (2013.01); *C01B 2203/0415* (2013.01); *C01B 2203/0465* (2013.01); *C01B 2203/068* (2013.01)

(58) Field of Classification Search
CPC .... C01B 2203/0405; C01B 2203/0415; C01B 2203/0465; C01B 2203/068; C25B 1/04
See application file for complete search history.

(56) References Cited

U.S. PATENT DOCUMENTS 4,750,925 A 6/1988 MacLean et al.
4,752,311 A 6/1988 MacLean et al.
6,900,247 B2 5/2005 Price et al.
10,597,301 B2 3/2020 Kawasaki et al.
2007/0122329 A1* 5/2007 Briglia ...................... C01B 3/54 422/600
2013/0108538 A1* 5/2013 Ostuni .................. C01C 1/0476 422/148
2019/0092645 A1* 3/2019 Kawasaki ............ B01D 53/047

OTHER PUBLICATIONS

International Search Report mailed mailed Jul. 5, 2024 for the corresponding PCT International Patent Application No. PCT/NL2024/050155; 3 pages.

“Chapter Ammonia, 2.”, Ullmann’s Encyclopedia of Industrial Chemistry, 2012, vol. 3; 88 pages.

Esmaeilzadeh et al, “Purge gas recovery in ammonia plants”, UreaKnowHow.com, Process Paper May 2010; 6 pages.

* cited by examiner

PURGE GAS CONDITIONING OF NH3 PLANTS

CROSS-REFERENCE TO RELATED PATENT APPLICATIONS

This application is a U.S. National Stage Application under 35 U.S.C. § 371 of International Patent Application No. PCT/NL2024/050155 filed Mar. 28, 2024, which claims the benefit of priority of European Patent Application numbers 23165617.4 filed Mar. 30, 2023, all of which are incorporated by reference in their respective entireties. The International Application was published on Oct. 3, 2024, as International Publication No. WO 2024/205408 A1.

FIELD

The disclosure generally relates to $NH_3$ production. Embodiments of the disclosure pertain to the conditioning of the purge gas stream in an ammonia synthesis plant. The $NH_3$ plant in particular comprises a water electrolysis unit to produce a $H_2$ stream and an ammonia synthesis loop for reacting said $H_2$ stream with a $N_2$ feed.

INTRODUCTION

Ammonia is a major synthetic chemical product and feedstock for fertilizer production. Generally a $H_2$—$N_2$ mixture is reacted over a catalyst at elevated temperature (e.g. above 300° C.) and pressures above e.g. 100 bar(a) with recycle of the unconverted part of the synthesis gas and separation of the ammonia product under high pressure. Apart from nitrogen and hydrogen, the fresh make-up gas supplied to the synthesis loop usually contains small quantities of inert gases. Typically, these inert gases include methane (from gas generation from hydrocarbons), argon (from the process air), and helium (from the natural gas conventionally used for $H_2$ production in many prior art plants). Due to their inert nature under reaction conditions, these components tend to concentrate in the synthesis loop and must be removed to maintain the loop material balance. A small portion of the inert gases dissolves in the liquid produced in the ammonia separator. In addition, inert gases have to also be removed from the gas phase by withdrawing a small purge-gas stream from the loop. See, in this respect, Ullmann's Encyclopedia of Industrial Chemistry, 2012, vol. 3, Chapter Ammonia 2.

There are several known methods for reducing the losses associated with the purge gas, including cryogenic hydrogen recovery, hydrogen recovery by pressure swing adsorption (PSA), and hydrogen recovery by membrane separation. Ullmann's Encyclopedia of Industrial Chemistry, 2012, vol. 3, Chapter Ammonia 2, p. 208-209 discusses a membrane separation method for hydrogen removal. The purge gas is reduced in pressure and water scrubbed at 135-145 bar and sent to the membrane separators; hydrogen from the permeate side is sent to the synthesis gas compressor for recycle to the ammonia synthesis loop. The document mentions that the remaining non-permeate gas stream "normally flows to primary reformer fuel".

However, for so-called 'green ammonia plants', i.e. plants wherein the hydrogen feedstock is prepared by water electrolysis, no primary reformer will typically be present. Accordingly, there is a need for processes and systems for the disposal of purge from green ammonia plants.

In green ammonia plants, the quantity of inert gases will typically be smaller than in 'grey' ammonia plants, i.e. plants with the conventional hydrogen production from hydrocarbons, typically by steam reforming. At least in green ammonia plants without purification of the $N_2$ feed upstream of the ammonia synthesis, the quantity will, however, not be nil, and disposal of a purge stream is necessary. $N_2$ is typically prepared from air, and although purification of the $N_2$ feed stream by (cryogenic) argon removal upstream of synthesis is possible, such purification is not always desirable, e.g. in terms of costs (capital expenditure and/or operating expenses).

US20190092645A1 describes an ammonia production method including: synthesizing ammonia through electrolysis using water and nitrogen as raw materials; subjecting the resultant gas to treatment using an ammonia separation membrane or an ammonia PSA to separate the gas into high-concentration ammonia and a residual gas; recycling the residual gas as a nitrogen gas raw material of an ammonia synthesis reactor, and liquefying the high-concentration ammonia recovered through the ammonia separation membrane or the ammonia PSA.

There is a desire for improved purge systems and methods for ammonia plants wherein the $H_2$ feed production involves water electrolysis.

SUMMARY

The invention pertains in a first aspect to a process for conditioning a purge gas stream in an ammonia synthesis plant; the plant comprising a water electrolysis unit to produce a $H_2$ stream and an ammonia synthesis loop for reacting said $H_2$ with $N_2$ feed, the process comprising: obtaining, preferably separating, a purge stream from said ammonia synthesis loop, wherein said purge stream is gaseous and comprises $N_2$, $H_2$, $NH_3$ and Ar; subjecting said purge stream to a treatment, preferably at a pressure of 10-70 bar(a), comprising scrubbing in a scrubber and membrane separation in a membrane separation unit to remove at least a part of the $NH_3$ and at least part of the $H_2$ from the purge gas stream, to provide a treated purge stream, a gaseous stream comprising $H_2$ and a liquid stream, wherein the membrane separation uses a hydrogen-selective membrane having a permeate side and a retentate side, and involves supplying a sweep gas comprising $N_2$ at the permeate side of the membrane; and recycling the gaseous stream in part or entirely to the ammonia synthesis loop.

The invention also provides an ammonia synthesis plant comprising a water electrolysis unit to produce a $H_2$ stream; an ammonia synthesis loop for reacting said $H_2$ with $N_2$ feed and having an outlet for a gaseous purge stream; and a section (treatment section) comprising a scrubber and a membrane separation unit for subjecting said purge stream to a treatment, preferably at a pressure of 10-70 bar(a), comprising scrubbing in the scrubber and membrane separation in the membrane separation unit to remove at least a part of the $NH_3$ and at least part of the $H_2$ from the purge gas stream, to provide a treated purge stream, a gaseous stream comprising $H_2$ and a liquid stream, wherein the membrane separation unit comprises a hydrogen-selective membrane, a permeate side compartment and a retentate side compartment, and a supply for a sweep gas to the permeate side compartment; and a flow line for recycling the gaseous stream in part or entirely to the ammonia synthesis loop.

Also provided is a method of modifying an existing ammonia synthesis plant.

Embodiments of the disclosure pertain to the conditioning of the purge gas stream in an $NH_3$ synthesis plant comprising a water electrolysis unit to produce a $H_2$ stream, ammonia synthesis loop, and a treatment section for treating purge gas using scrubbing and membrane separation, preferably at 10-70 bar(a).

Figure 1:
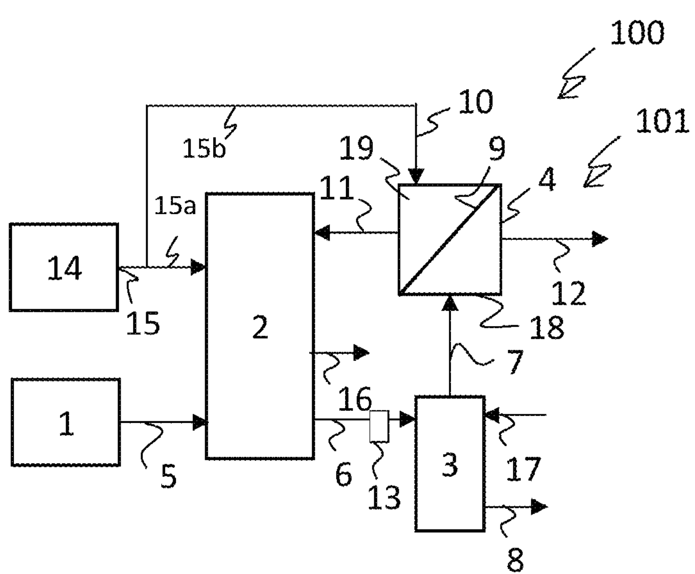
FIG. 1 schematically illustrates an example process and plant according to the invention.

Any embodiments illustrated in the figures are examples only and do not limit the invention.

DETAILED DESCRIPTION

The invention pertains, in an aspect to a process for conditioning a purge gas stream in an ammonia synthesis plant. The invention also provides an ammonia production process comprising the conditioning process. The process for conditioning a purge gas stream may also be referred to as a process for recovering $NH_3$ and $H_2$ from the purge gas stream; wherein the $NH_3$ is optionally recovered as ammonium salt. Optionally, argon (Ar) is also recovered from the purge gas stream. Recovering a component here broadly includes reducing the content of the component in the gas stream and obtaining said removed component, e.g. for further disposal, recycle, or as a product.

The process is carried out in an ammonia synthesis plant. The plant comprises a water electrolysis unit to produce $H_2$ and an ammonia synthesis loop for reacting said $H_2$ with $N_2$ feed. The term water electrolysis unit, as used herein, includes units wherein $H_2O$ is electrolysed, the $H_2O$ can be provided as liquid water or as steam. The water electrolysis unit is, for instance, a solid oxide electrolyzer cell.

In embodiment of the invention pertaining to an ammonia production process comprising the conditioning process, the process also involves electrolyzing water in said water electrolysis unit to produce $H_2$ (and $O_2$), and producing $NH_3$ in said ammonia synthesis loop by reacting said $H_2$ from the water electrolysis unit with $N_2$ feed. All preferences and details for the conditioning process, also apply to the ammonia production process comprising the conditioning process.

Optionally, the process comprises a step of producing $N_2$ feedstock for the ammonia synthesis. Preferably this step is performed in a nitrogen generation unit (NGU), more preferably by air separation.

The $H_2$ feedstock for $NH_3$ synthesis is preferably at least 90 mol. % obtained from water electrolysis. Thereby, the purge gas stream is preferably essentially free of hydrocarbons, e.g. less than 10 ppmv. Water electrolysis, air separation and other nitrogen generation units, and $NH_3$ synthesis are each well-known in the art as such.

The $NH_3$ synthesis is generally carried out in a synthesis loop comprising a converter operated above 70 bar(a), e.g. above 100 bar(a), such as, for example, in the range 150 to 400 bar(a), for example 150 to 300 bar(a) or 150 to 250 bar(a). The convertor effluent is subjected to condensation of $NH_3$ to obtain a high pressure liquid stream comprising (or essentially consisting of) $NH_3$, and a high pressure gaseous stream, above 70 bar(a), e.g. above 100 bar(a), or above 150 bar(a), and e.g. up to 400 bar(a). The high pressure gaseous stream is in part purged as a purge stream, and in part recycled in the synthesis loop. Optionally the convertor effluent is compressed prior to the condensation. Feedstock is supplied as make-up gas to the synthesis loop and is typically compressed to the synthesis pressure by a compressor, which can be, e.g., a dedicated compressor, the same compressor as optionally used for the effluent or the recycled gaseous stream, or a combination thereof.

The process hence involves separating, or obtaining, a purge gas stream from the ammonia synthesis loop. The purge gas stream comprises $N_2$, $H_2$, $NH_3$ and Ar, and may optionally contain further components. The further components, if present, are typically present at less than 5 vol. % of the purge gas stream in total. The purge gas stream is for instance made available at a pressure above 100 bar(a), or above 150 bar(a), and preferably up to 350 bar(a), or up to 300 bar(a); and is reduced in pressure, preferably to a pressure in the range of 10-70 bar(a). The separating step may involve dividing a gas stream in the purge gas stream and a gas stream that is recycled in the synthesis loop.

The process involves subjecting the purge stream to a purifying treatment at a pressure of preferably 10-70 bar(a); this treatment comprises scrubbing the purge stream in a scrubber and membrane separation of the purge stream in a membrane separation unit, in either order. The treatment is used to remove at least a part of the $NH_3$ and at least part of the $H_2$ from the purge gas stream. The treatment provides a treated purge stream, a gaseous stream comprising $H_2$ and a liquid stream. The membrane separation uses a hydrogen-selective membrane having a permeate side and a retentate side, and involves supplying a sweep gas comprising $N_2$ at the permeate side of the membrane. The process preferably involves scrubbing upstream of the membrane separation, for stability of the membrane; details for this embodiment are described hereinafter. However, in principle scrubbing downstream of the membrane separation is also possible. The described preferences and details also apply to this embodiment.

The process preferably involves subjecting the purge stream to a treatment to remove $NH_3$ from the purge stream (reduce the $NH_3$ content of the purge stream), preferably scrubbing, for instance aqueous scrubbing or acid scrubbing, to remove $NH_3$ from the purge gas stream, thereby providing a scrubbed purge stream. The scrubbing is carried out at a pressure of preferably at least 10 bar(a) and/or max. 70 bar(a), in particular in the range 10-70 bar(a), more preferably in the range 10-50 bar(a), or even 10-40 bar(a), or 20-50 bar(a) or 20-40 bar(a).

The process typically involves reducing the pressure of the purge gas stream, e.g. by at least 10 bar(a), or at least 50 bar(a), or at least 100 bar(a), between the synthesis loop and the scrubber, i.e. from the synthesis loop pressure to the scrubber pressure. Hence, the plant comprises a pressure reducing element, for instance an ejector, control valve or turbo expander, in the flow line for the purge gas stream from the synthesis loop to the scrubber.

The pressure reducing element comprises (or is) for instance an ejector which preferably also receives a gas stream that is obtained from a step of flashing said high pressure $NH_3$ liquid stream, i.e. flashed gas obtained from flashing of an $NH_3$ liquid stream formed in (and withdrawn from) the ammonia synthesis loop. In particular, the $NH_3$ synthesis is generally carried out in an ammonia synthesis loop comprising a converter operated above 70 bar(a), e.g. above 100 bar(a), such as, for example, in the range 150 to 300 bar(a) or 150 to 250 bar(a). The convertor effluent is subjected to condensation of $NH_3$ to obtain a high pressure liquid stream comprising (or essentially consisting of) $NH_3$, and a separate high pressure gaseous stream, above 70 bar(a), e.g. above 100 bar(a), or above 150 bar(a), and e.g.

up to 400 bar(a), preferably in the range 150 bara to 300 bar(a) or 150 bar(a) to 250 bar(a). The high pressure gaseous stream is typically in part purged as the purge stream, and in part recycled in the synthesis loop. The liquid stream is preferably flashed, giving a gaseous stream and a flashed liquid stream. The relatively low pressure of the purge gas after the ejector is advantageous for the transport of the flashed gas to the treatment section.

For example in the inventive $NH_3$ plant and process, the liquid ammonia of the HP (high pressure) gas/liquid separator (HP indicating above 70 bar(a), e.g. above 100 bar(a)) is flashed (in one or more steps) to about 20 bar(a), or even flashed further to atmospheric pressure, whereby the majority of the dissolved gases are released in a let-down vessel (i.e. a flash vessel). The gas from the let-down vessel is optionally also subjected to the treatment comprising scrubbing and membrane separation and is for instance supplied to the scrubber using said ejector. The gas/liquid separator is e.g. provided by a condenser.

The scrubbing involves contacting the gaseous purge stream with a scrub liquid, preferably with a liquid film, for example with counter-current contact. The scrub liquid comprises water and may optionally comprise other components, such as acids, preferably inorganic acids, preferably nitric acid, phosphoric acid, or sulphuric acid. Use of acids to remove $NH_3$, with formation of ammonium salts, can be advantageous with relatively lower operating pressure of the scrubber. A large part or essentially all of the $NH_3$ in the gas phase is absorbed by the liquid (transfers into the liquid phase) and is removed from the gas stream, for instance at least 90 mol. % or at least 99 mol. % or at least 99.9 mol. % of the $NH_3$. Suitable scrubbing systems, with and without the use of acids, are known in the art as such.

Operating the scrubber at this pressure range, i.e. lower pressure than the synthesis pressure, in particular below 70 bar(a), or below 50 bar(a), or below 30 bar(a), allows for relatively simple construction of the scrubber as no high pressure equipment is necessary (in particular, construction of the pressure bearing walls).

Moreover, less $N_2$, $H_2$ and Ar will dissolve in the liquid phase, given the Henry coefficient for $H_2$ and $N_2$ in water and the physical absorption mechanism, thereby advantageously improving the recycle of feed $H_2$ to synthesis. Operating the scrubber at a pressure above 10 bar(a) is advantageous for the downstream membrane separation.

The relatively low pressure of the scrubbing step was also found to be advantageous in the specific context of the $H_2$ feed being obtained from water electrolysis, to have a volumetric flow rate of the purge gas that is more suitable for the scrubbing even with a given mass flow rate.

The scrubber is for instance a column, e.g. with internals (e.g. Pall rings) or a packed bed, and typically has a gas outlet for the scrubbed gas stream and a separate liquid outlet, typically with the gas outlet at the top and liquid outlet at the bottom. The scrubber has for instance an inlet for scrub liquid at an upper part and the gas inlet at the bottom. The scrub liquid is for instance recirculated, with cooling, and partially purged; the $NH_3$ content is for instance, without limitation, kept in the range of at least 10 and/or up to 40 wt. % $NH_3$, e.g. 20-30 wt. % $NH_3$ as aqueous solution, though lower and higher concentrations of $NH_3$ are also possible. The liquid from the scrubber is e.g. regenerated in a desorber with heating to boil $NH_3$ from the water, or supplied to a unit using the liquid, or sold as a stand-alone product useful, for example, for catalytic selective reduction of $NO_x$ from combustion engine exhaust gas.

Optionally, the purge gas stream is passed entirely or in part through a catalytic reactor prior to (upstream of) pressure reduction, wherein unconverted $H_2$ and $N_2$ can react to $NH_3$. The catalytic reactor is hence operated at a pressure above 100 bar(a). A plant comprising such a reactor typically also includes a bypass flow line for the purge gas stream to bypass this reactor.

In some embodiments, the scrubbing upstream of the membrane separation involves acid scrubbing, as discussed, wherein the purge gas stream is contacted with an acid solution, in particular aqueous acid solution, at said pressure (preferably 10-70 bar(a)), such that $NH_3$ from the gas stream is converted into an ammonium salt solution. Typically inorganic acids are used. In such a case, the membrane and membrane separation unit of the membrane separation step is acid-resistant. The membrane is e.g. a hollow fiber membrane and is e.g. a polymeric membrane, for instance based on poly-imide. Other types of membranes are as such known in the art and include e.g. poly(dimethylsiloxane), polysulfone, poly(phenylene oxide), cellulose acetate, polyimides, polynorbonene/6FDA-durene blend.

In embodiments with hollow fiber membrane, the retentate side compartment is for instance provided by the inner volume of the fibers and the permeate side compartment by the shell, or vice versa.

Other options for the membranes include, e.g., Pd membranes and carbon-based membranes.

The process furthermore preferably involves contacting the scrubbed purge stream with a hydrogen-selective membrane having a permeate side and a retentate side, thereby obtaining a gaseous permeate stream and a gaseous retentate stream.

The step is carried out in a membrane separation unit, which is for example a dedicated unit separate from the scrubber. The membrane may divide the unit in a permeate side compartment and a retentate side compartment. The retentate side compartment has a gas inlet preferably for the scrubbed purge gas stream and a gas outlet for a gaseous retentate stream, and optionally an inlet for flushing with $H_2$ feedstock. Flushing, if optionally used, typically involves supplying $N_2$ to the retentate compartment to remove absorbed $NH_3$.

The permeate side compartment has an inlet for a sweep gas stream and an outlet for the permeate stream.

The process involves sweeping the membrane at the permeate side with a sweep gas stream comprising $N_2$. Hence, a flow of a sweep gas stream which comprises $N_2$ is supplied at the permeate side of the membrane. The sweep gas preferably has a pressure of 5-20 bar(a), more preferably 5-15 bar(a), and comprises e.g. at least 98 vol. % $N_2$.

The process involves the selective transfer of hydrogen through the membrane from the retentate side to the permeate side. The $H_2$ partial pressure of the retentate stream is lower than that of the gas at the permeate side, preferably scrubbed purge gas. The sweep gas contains, at the inlet of the permeate compartment, e.g. less than 0.01 bar partial pressure $H_2$. The sweep gas provides for low partial pressure of $H_2$ at the permeate side, contribute to motive force for $H_2$ transport through the membrane, even with balanced total pressure at both sides of the membrane. This advantageously permits a large driving force without sacrificing (total) pressure.

The sweep gas is preferably supplied in the permeate side compartment in a direction counter-currently with respect to the gas flow in the retentate side compartment, preferably in embodiments with a membrane module with hollow fiber membranes, and most preferably with the permeate side on the shell side.

In an attractive embodiment, the sweep gas stream originates from an outlet for a $N_2$ gas stream of a nitrogen generation unit (NGU), which unit also provides said $N_2$ feed. The NGU is a air-to-nitrogen production unit which optionally also produces a highly pure $O_2$ stream.

The NGU is for instance an air separation unit (ASU). Hence, for example the nitrogen-rich gas stream from an ASU is divided in a first part supplied to the $NH_3$ synthesis loop and a second part supplied to the permeate compartment of the membrane separation unit; optionally a third part is used elsewhere. Suitable, the NGU or ASU makes the $N_2$ rich gas stream available at a pressure of 10-30 bar(a), which is advantageous for membrane separation, and typically with at least 98 vol. % $N_2$, or at least 99.5 mol. % $N_2$.

Other suitable types of NGUs which can be used in embodiments of the invention include cryogenic distillation, pressure swing adsorption (PSA), and membrane purification.

The process involves recycling the permeate stream in part or entirely to the ammonia synthesis loop in embodiment the membrane separation downstream of the scrubber. The permeate stream comprises, typically, at least 90 vol. % or at least 95 vol. % $N_2$ and $H_2$ in total, at the outlet of the permeate compartment. The permeate stream contains, e.g., 70-95 vol. % $N_2$ and 5-30 vol. % $H_2$. The permeate stream typically has sufficient purity to be supplied to the ammonia synthesis loop. The permeate stream is typically supplied to a compressor to or in the ammonia synthesis loop, optionally after suitable treatment to remove water. It is noted that compression of the $N_2/H_2$ mixture to synthesis pressure is relatively advantageous in terms of energy.

The permeate stream for example has a pressure in the range 10-70 bar(a), e.g. 10-30 bar(a), at the outlet of the permeate compartment of the membrane separation unit, and typically has the same pressure as the $N_2$ from the nitrogen generation unit. A pressure of 20-30 bar(a) at the outlet of the permeate compartment of the membrane separation unit is also advantageous in case of the water electrolysis unit yielding $H_2$ at a pressure above 10 bar(a), or in the range 20-30 bar(a).

The combination of permeate recycle to synthesis and the use of sweep gas and membrane separation provides for a configuration is very suitable for relatively small-scale plants, which is especially advantageous for ammonia plants with $H_2$ feedstock from water electrolysis.

In an example embodiment, the treated purge stream, preferably retentate stream, is recycled to the ammonia synthesis loop in part or entirely, for instance 10-90 wt. % of the stream, preferably retentate. In this way, $N_2$ and $H_2$ contained in the treated purge stream, preferably retentate stream, can be recovered at least in part. The treated purge stream, preferably retentate stream, comprises for instance at least 95 vol. % $N_2$ and for instance less than 1.0 vol. % $H_2$.

Preferably, the treated purge stream, preferably retentate stream is, in part or entirely, vented or supplied to Ar recovery, i.e. to an argon recovery unit or step. For example, the balance of the treated purge stream, preferably the retentate stream, is vented or supplied to the Ar recovery. Venting refers to release into the environment (atmosphere), optionally after further treatments such as scrubbing. For instance, the treated purge stream, preferably retentate stream, is in part or entirely subjected to acid scrubbing, e.g. with a mineral acid, such as, e.g., phosphoric acid, nitric acid or sulphuric acid, to remove (or remove more) $NH_3$ from the gas stream, upstream of the venting or the Ar recovery. The acid scrub unit is optionally a shared unit in a vent line of a fertilizer plant. For instance, at least a part treated purge stream, preferably retentate, is supplied to the acid wash unit of a urea plant, or to a finishing section of a urea plant (e.g. prilling tower or granulator), or to a nitric acid plant or ammonium nitrate plant, or generally to a fertilizer plant or fertilizer finishing section.

Another possibility is to supply the treated purge stream, preferably retentate, at least in part, to a unit for recovery of Ar, for instance by cooling. In this way advantageously Ar product may be obtained. The treated purge gas, preferably retentate gas stream that is supplied to Ar recovery can also be subjected to a treatment upstream of the Ar recovery, e.g. said acid scrubbing.

The plant may be configured for operating in a mode wherein all treated purge gas, preferably retentate, is recycled, and a mode wherein no treated purge gas, preferably retentate, is recycled to the $NH_3$ synthesis, and optionally a further mode with partial recycle; and can preferably switch between these operating modes. The fraction of the treated purge gas, preferably the retentate, that is recycled to the $NH_3$ synthesis loop can vary, in principle from 0 to 100 vol %, e.g. 10-90 vol. %. The inventive conditioning process may also carried out in such a plant and/or in a mode with full, partial, or no recycle of the treated purge gas, preferably retentate, to the $NH_3$ synthesis. The skilled person can adjust the fraction of the treated purge stream, preferably retentate stream, that is vented as necessary to keep level of inert gaseous species in the ammonia synthesis loop sufficiently low.

Typically, in embodiments wherein a part or all of the treated purge gas, preferably the retentate, is vented into the environment, optionally after further treatments, no flaring is used. Preferably the treated purge gas, preferably retentate, is not subjected to combustion. This advantageously reduces $CO_2$ emissions compared to prior art processes with flaring of hydrocarbon-containing purge gas streams from $NH_3$ synthesis. Further advantages include a simpler design and eliminating noise, light and heat pollution from the flaring, and smaller footprint.

The inventive process and plant configuration is especially advantageous for relatively smaller, modular plants, that are operated e.g. on a stand-alone basis, not connected to a larger chemical plant.

The invention also provides an ammonia synthesis plant comprising a water electrolysis unit to produce a $H_2$ stream and an ammonia synthesis section (loop) for reacting said $H_2$ with $N_2$ feed. The plant typically also comprises an NGU, such as an ASU for providing the $N_2$ feed. Preferences for the process apply also for the plant; and vice versa.

The ammonia synthesis section comprises an outlet for a gaseous purge stream. The plant comprises a section (treatment section) comprising a scrubber and a membrane separation unit. The treatment section is configured for subjecting said purge stream to a purifying treatment at a pressure of 10-70 bar(a); the treatment comprises scrubbing the purge gas stream in the scrubber and membrane separation in the membrane separation unit to remove at least a part of the $NH_3$ and at least part of the $H_2$ from the purge gas stream. The treatment provides a treated purge stream, a gaseous stream comprising $H_2$ and a liquid stream. The scrubber is preferably arranged upstream of the membrane separation unit (for the gas stream), or alternatively downstream of the membrane separation unit. The membrane separation unit comprises a hydrogen-selective membrane, a permeate side compartment and a retentate side compartment, and a supply for a sweep gas permeate side compartment. The plant comprises a flow line for recycling the gaseous stream in part or entirely to the ammonia synthesis loop. The plant preferably comprises a flow line from the NGU to said permeate side compartment, to provide $N_2$ from the NGU as said sweep gas.

In the preferred embodiment wherein the scrubber is arranged upstream of the membrane separation unit, the scrubber has an outlet for the liquid stream which comprises a solution of ammonia or ammonium salt, and an outlet for a scrubbed purge stream. The membrane separation unit has an inlet for the scrubbed purge stream in the retentate side compartment in this embodiment, and an outlet for the gaseous stream from the permeate side compartment (connected to the recycle flow line to the ammonia synthesis section) and an outlet for the treated purge stream from the retentate side compartment.

The inventive plant configuration is advantageous for grassroots plants and also for modification of existing plants.

Provided is a method of modifying an existing ammonia synthesis plant, the existing plant comprising a water electrolysis unit to produce a $H_2$ stream; an ammonia synthesis loop for reacting said $H_2$ with $N_2$ feed and having an outlet for a gaseous purge stream; wherein the method involves providing the plant with a section comprising a scrubber and a membrane separation unit for subjecting said purge stream to a treatment at a pressure of 10-70 bar(a) comprising scrubbing in the scrubber and membrane separation in the membrane separation unit to remove at least a part of the $NH_3$ and at least part of the $H_2$ from the purge gas stream, to provide a treated purge stream, a gaseous stream comprising $H_2$ and a liquid stream, wherein the membrane separation unit comprises a hydrogen-selective membrane, a permeate side compartment and a retentate side compartment, and a supply for a sweep gas to the permeate side compartment; and a flow line for recycling the gaseous stream in part or entirely to the ammonia synthesis loop. Preferences and details for the inventive plant apply also for the modified plant. In the method, an existing section for the treatment of the purge gas stream can be replaced or adapted to have the recited features.

FIG. 1 schematically illustrates an example process and plant according to the invention. The ammonia synthesis plant (100) comprises a water electrolysis unit (1) which has an outlet for a $H_2$ stream (5) that is supplied to the ammonia synthesis loop (2). The plant also comprises an $N_2$ generation unit (14) which produces an $N_2$ stream (15) which is used, in part or entirely, as $N_2$ feed for the ammonia synthesis loop (2) and which is preferably used in part as the sweep gas (10). As illustrated, a first part (15*a*) of the $N_2$ stream (15) is used as $N_2$ feed for the ammonia synthesis loop (2) and a second part (15*b*) of the $N_2$ stream (15) is used as sweep gas (10) in the membrane separation unit (4). The ammonia synthesis loop (2) has an outlet (16) for $NH_3$ product and an outlet for a purge stream (6). The purge stream (6) is reduced in pressure to 10-70 bar(a) in an pressure reduction element (13), e.g. a control valve or an ejector, or a combination thereof. The plant (100) comprises a treatment section (101) where the purge stream (6) is treated, which section comprises a scrubber (3) and a membrane separation unit (4). The treatment section (101) has separate outlets for a treated purge stream (12), a gaseous stream (11) comprising $H_2$, and a liquid stream (8). In the illustrated example, the purge stream (6) is first scrubbed at 10-70 bar(a) in the scrubber (3) using scrub liquid (17) which is preferably acid scrub liquid. A spent scrub liquid stream (8) is obtained. The scrubbed purge stream (7) is supplied to the membrane separation unit (4) which comprises a hydrogen-selective membrane (9), a permeate side compartment (19) and a retentate side compartment (18), and which has an outlet for treated purge stream (12) at the retentate side (18). At the permeate side, a sweep gas (10) comprising $N_2$ is supplied, typically from the $N_2$ generation unit (14), and the resulting gaseous stream (11) comprising $H_2$ is supplied from the permeate side compartment (19) to the $NH_3$ synthesis loop (2), for instance by combination with $H_2$ stream (5). The pressure in the retentate side compartment (18) is e.g. max. 5 bar lower than in the scrubber (3). The pressure at the permeate side compartment (19) is e.g. at least 10 bar lower than in the retentate side compartment (18).

Figure 2:
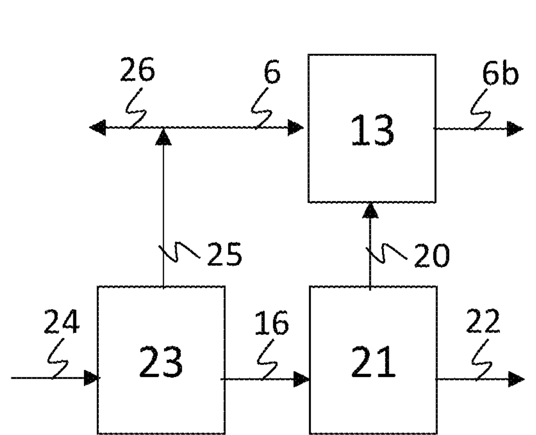
FIG. 2 schematically illustrates an example configuration of an ejector used in preferred embodiments.

FIG. 2 schematically illustrates an example configuration of the pressure reducing element (13), namely as an ejector that receives, as motive fluid, the purge gas stream (6) at synthesis pressure (e.g. above 70 bar(a), e.g. 150-400 bar(a)) and also receives, separately, a flashed gas stream (20) having a lower pressure than the purge stream (6). The flashed gas stream (20) originates from a flash vessel (21) of the ammonia synthesis plant. In this flash vessel, a high pressure ammonia liquid stream (16) is flashed, i.e. depressurized with gas/liquid separation, to give a flashed liquid stream that provides the $NH_3$ product (22), and the gaseous stream (20). The high pressure ammonia liquid stream (16) originates from the synthesis loop, in particular from a gas/liquid separator of (23) that is part of the synthesis loop, downstream of the convertor. The gas/liquid separator is in particular a condenser (23) where the convertor effluent (24) is separated by condensation, e.g. at high pressure of above 70 bar(a) or above 100 bar(a), into the high pressure ammonia liquid stream (16) and a gas stream (25). For example, the gas stream (25) is in part (26) recycled to the convertor and in part provides the purge gas stream (6). It is also possible that the entire gas stream (25) is supplied to the convertor and that the purge gas (6) is withdrawn from the synthesis loop between the convertor and the condenser. The loop may contain one or two or more $NH_3$ condensers as said gas/liquid separator. The synthesis loop usually comprises a compressor (in particular, feed compressor) arranged upstream or downstream of the $NH_3$ condenser. Herein, the $NH_3$ product from the condensers (unit B or C) is flashed to give the flashed gas stream (20) and a liquid product stream.

It is observed that a relatively lower ammonia synthesis pressure (e.g. 100 to 300 bar(a), preferably 150 to 300 bar(a), more preferably 150 to 250 bar(a)), as can be attractive for plants with ammonia synthesis in combination with water electrolysis, may result in a relatively larger amount of purge gas to be withdrawn from the synthesis loop and a lower amount of gas dissolved in the high pressure ammonia liquid stream (16) supplied to the flash vessel. It was found that the purge gas stream can be judiciously used as motive fluid for the ejector for the flash gas in preferred embodiments of the present disclosure.

The ejector (13) has an outlet for a combined gas stream (6*b*) connected to the treatment section (101), e.g. to the scrubber (3).

Figure 3:
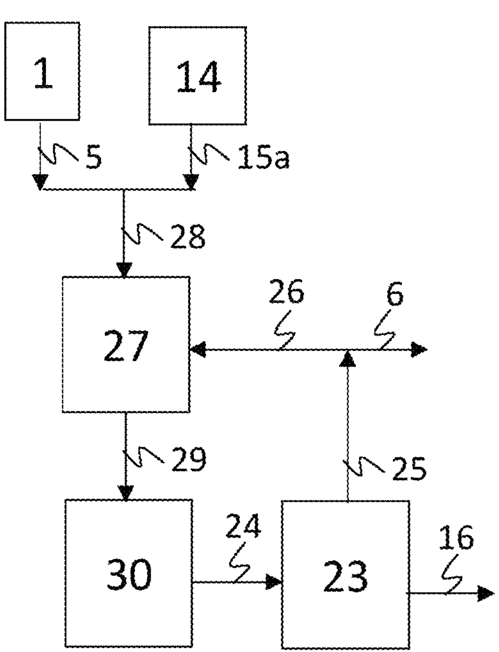
FIG. 3 schematically illustrates an example configuration of an ammonia synthesis loop used in preferred embodiments.

FIG. 3 schematically illustrates an example configuration of the ammonia synthesis loop. A compressor (27) receives a feed stream (28) as well the recycle gas stream (26). The feed stream (28) is provided by the $H_2$ stream (5) from the water electrolysis unit (1) and the $N_2$ stream (15) or a part thereof (15*a*) from the nitrogen generation unit (14).

The compressed gas stream (29) is supplied to the convertor (30). The convertor effluent (24) is supplied to the condenser (23). Gas (25) from the condenser is in part (26)

recycled to convertor (30) through the compressor (27) and in part purged as purge stream (6). The liquid (16) from the condenser (23) contains the $NH_3$ product, is obtained from the loop, and is supplied preferably to the flash vessel (21). The skilled person understands that other configurations of the ammonia synthesis loop are also possible, see e.g. Ullmann's Encyclopedia of Industrial Chemistry, 2012, vol. 3, Chapter Ammonia 2 FIG. 30.

All pressures are absolute pressures in bar, abbreviated as bar(a), unless otherwise indicated. The term 'typically' as used herein indicates features which are frequently used but are not essential.

EXAMPLES

The invention will now be further illustrated by the following non-limiting examples. These examples do not limit the invention and do not limit the claims.

Example 1

An example simulated inventive process for conditioning a purge gas stream carried out in the system of FIG. 1 is operated with the gas streams as indicated in Table 1.

Nitrogen stream (10) is specified in Table 1 on the basis of $N_2$ generation via cold-box cryogenic methods (i.e. relatively low argon content) for a 450 MTPD (metric ton per day) green ammonia plant.

The entire gaseous stream (11) comprising $H_2$ is supplied from the permeate side compartment (19) is recycled to the $NH_3$ synthesis.

Table 2 shows a reference process, differing from Table 1 in that no sweep gas (10) is used; the process is not according to the invention. Retentate (12) has an undesirable high $H_2$ content in Table 2, unlike Table 1.

TABLE 1

| Stream | | P bar(a) | Flow rate kmol/hr | $NH_3$ mol % | $H_2$ mol % | $N_2$ mol % | Ar mol % | $H_2O$ mol % |
|---|---|---|---|---|---|---|---|---|
| 6 | Purge | 35 | 49 | 08.89 | 67.61 | 23.29 | 0.11 | 0.00 |
| 7 | Scrubbed purge | 34.5 | 45 | 0.00 | 74.14 | 25.66 | 0.12 | 0.08 |
| 8 | Aq. $NH_3$ | 35 | 17 | 26.12 | 0.00 | 0.00 | | 73.88 |
| 10 | Sweep gas | 12.7 | 135 | 0.00 | 0.00 | 100 | 0.00 | 0.00 |
| 11 | Permeate | 12.3 | 169 | 0.00 | 19.61 | 80.34 | 0.02 | 0.02 |
| 12 | Retentate | 33 | 11 | 0.00 | 0.33 | 99.29 | 0.37 | 0.00 |

TABLE 2

(reference)

| Stream | | P bar(a) | Flow rate kmol/hr | $NH_3$ mol % | $H_2$ mol % | $N_2$ mol % | Ar mol % | $H_2O$ mol % |
|---|---|---|---|---|---|---|---|---|
| 6 | Purge | 35 | 49 | 08.89 | 67.61 | 23.29 | 0.11 | 0.00 |
| 7 | Scrubbed purge | 34.5 | 45 | 0.00 | 74.14 | 25.66 | 0.12 | 0.08 |
| 8 | Aq. $NH_3$ | 35 | 17 | 26.12 | 0.00 | 0.00 | | 73.88 |
| 11 | Permeate | 11 | 25 | 0.00 | 95.15 | 4.70 | 0.04 | 0.10 |
| 12 | Retentate | 33 | 20 | 0.00 | 47.56 | 52.18 | 0.22 | 0.04 |

Example 2

Table 3 shows process streams of the a purge gas recovery process according to the invention, similar to the process of Table 1 but assuming $N_2$ generation via pressure swing adsorption method (i.e. relatively high argon content) for a 450 MTPD green ammonia plant.

Table 4 shows a similar process as in Table 3 differing in that no sweep gas (10) is used; this process is not according to the invention. Retentate (12) has an undesirable high $H_2$ content, unlike Table 3.

The process configurations of Tables 2 and 4 are presented as reference processes without implying or admitting that these processes are prior art. The process of the claimed invention may differ from prior art processes in one or more other or additional features than the use of sweep gas.

TABLE 3

| Stream | | P bar(a) | Flow rate kmol/hr | $NH_3$ mol % | $H_2$ mol % | $N_2$ mol % | Ar mol % | $H_2O$ mol % |
|---|---|---|---|---|---|---|---|---|
| 6 | Purge | 35 | 92 | 9.10 | 62.27 | 21.43 | 7.20 | 0.00 |
| 7 | Scrubbed purge | 34.5 | 84 | 0.00 | 68.44 | 23.56 | 7.92 | 0.08 |
| 8 | Aq. $NH_3$ | 35 | 17 | 26.09 | 0.00 | 0.00 | | 73.91 |
| 10 | Sweep gas | 12.7 | 241 | 0.00 | 0.00 | 100 | 0.00 | 0.00 |
| 11 | Permeate | 12.3 | 300 | 0.00 | 19.13 | 80.43 | 0.42 | 0.02 |
| 12 | Retentate | 33 | 24 | 0.00 | 0.26 | 77.42 | 22.32 | 0.00 |

TABLE 4

(reference)

| Stream | | P bar(a) | Flow rate kmol/hr | $NH_3$ mol % | $H_2$ mol % | $N_2$ mol % | Ar mol % | $H_2O$ mol % |
|---|---|---|---|---|---|---|---|---|
| 6 | Purge | 35 | 92 | 9.10 | 62.27 | 21.43 | 7.20 | 0.00 |
| 7 | Scrubbed purge | 34.5 | 84 | 0.00 | 68.44 | 23.56 | 7.92 | 0.08 |
| 8 | Aq. $NH_3$ | 35 | 17 | 26.09 | 0.00 | 0.00 | | 73.91 |
| 11 | Permeate | 12.3 | 41 | 0.00 | 92.02 | 4.90 | 2.95 | 0.12 |
| 12 | Retentate | 33 | 43 | 0.00 | 45.59 | 41.64 | 12.73 | 0.04 |

The invention claimed is:

1. A process for conditioning a purge gas stream in an ammonia synthesis plant comprising a water electrolysis unit to produce a $H_2$ stream and an ammonia synthesis loop for reacting said $H_2$ with an $N_2$ feed, the process comprising:

a) obtaining a purge stream from said ammonia synthesis loop, wherein said purge stream is gaseous and comprises $N_2$, $H_2$, $NH_3$ and Ar;

b) subjecting said purge stream to a treatment at a pressure of 10-70 bar (a) comprising scrubbing in a scrubber and membrane separation in a membrane separation unit to remove at least a part of the $NH_3$ and at least part of the $H_2$ from the purge gas stream, to provide a treated purge stream, a gaseous stream comprising $H_2$ and a liquid stream, wherein the membrane separation uses a hydrogen-selective membrane having a permeate side and a retentate side, and comprises supplying a sweep gas comprising $N_2$ at the permeate side of the membrane; and c) recycling the gaseous stream in part or entirely to the ammonia synthesis loop, wherein step a) comprises reducing the pressure of the purge stream from the pressure of the ammonia synthesis loop to a pressure in the range of 10 to 70 bar(a) with a pressure reducing element that comprises an ejector that also receives a gas stream that is obtained from a step of flashing a high pressure $NH_3$ liquid stream in the ammonia synthesis plant.

2. The process according to claim 1, wherein said sweep gas stream originates from an outlet for a $N_2$ gas stream of a nitrogen generation unit, which unit also provides said $N_2$ feed.

3. The process according to claim 2, wherein the nitrogen generation unit is an air separation unit.

4. The process according to claim 1, wherein the sweep gas has a pressure of 5-20 bar, and comprises at least 98 vol. % $N_2$.

5. The process according to claim 1, wherein the scrubbing and the membrane separation are carried out at 20-50 bar(a).

6. The process according to claim 1, wherein the treated purge stream is recycled in part to the ammonia synthesis loop.

7. The process according to claim 1, wherein the treated purge stream is in part or entirely vented or supplied to Ar recovery.

8. The process according to claim 7, wherein the venting is without combustion.

9. The process according to claim 1, wherein the scrubbing is carried out upstream of the membrane separation, wherein the scrubbing provides the liquid stream which comprises a solution of ammonia or ammonium salt, and a scrubbed purge stream, wherein the membrane separation comprises contacting the scrubbed purge stream in the membrane separation unit with the hydrogen-selective membrane having a permeate side and a retentate side, thereby obtaining the gaseous stream at the permeate side and the treated purge stream at the retentate side.

10. The process according to claim 1, wherein the membrane is a polymeric membrane.

11. The process according to claim 10, wherein the membrane is a hollow fiber membrane.

12. The process according to claim 1, wherein the scrubbing comprises acid scrubbing.

13. An ammonia production process, comprising:

producing an $H_2$ stream by water electrolysis in the water electrolysis unit and reacting said $H_2$ stream with $N_2$ feed to form $NH_3$ in said an ammonia synthesis loop;

obtaining and conditioning a purge stream from the ammonia synthesis loop with the process of claim 1.

14. The process according to claim 1, wherein said ammonia synthesis loop is operated at a pressure of above 100 bar(a).

15. The process according to claim 1, wherein said ammonia synthesis loop is operated at a pressure in the range 150-300 bar(a).

16. An ammonia synthesis plant comprising a water electrolysis unit to produce a $H_2$ stream; an ammonia synthesis loop for reacting said $H_2$ with an $N_2$ feed and having an outlet for a gaseous purge stream; and a treatment section comprising a scrubber and a membrane separation unit for subjecting said purge stream to a treatment at a pressure of 10-70 bar(a) comprising scrubbing in the scrubber and membrane separation in the membrane separation unit to remove at least a part of the $NH_3$ and at least part of the $H_2$ from the purge gas stream, to provide a treated purge stream, a gaseous stream comprising $H_2$ and a liquid stream, wherein the membrane separation unit comprises a hydrogen-selective membrane, a permeate side compartment and a retentate side compartment, and a supply for a sweep gas to the permeate side compartment; and a flow line for recycling the gaseous stream in part or entirely to the ammonia synthesis loop, wherein the ammonia synthesis plant comprises a flash vessel for flashing a high pressure $NH_3$ liquid stream from the ammonia synthesis loop, which flash vessel has a gas outlet and a liquid outlet, wherein said gas outlet is connected to an ejector provided in the flow line for the purge stream from the ammonia synthesis loop to said treatment section.

17. The plant according to claim 16, wherein the scrubber is arranged upstream of the membrane separation unit, wherein the scrubber has an outlet for the liquid stream which comprises a solution of ammonia or ammonium salt, and an outlet for a scrubbed purge stream, wherein the membrane separation unit has an inlet for the scrubbed purge stream in the retentate side compartment and an outlet for the gaseous stream from the permeate side compartment and an outlet for the treated purge stream from the retentate side compartment.

18. The plant according to claim 16, wherein said plant comprises a nitrogen generation unit providing said $N_2$ feed, wherein said nitrogen generation unit also has an outlet for a $N_2$ gas stream that is connected to said supply for said sweep gas.

19. The plant according to claim 18, wherein the nitrogen generation unit is an air separation unit.

20. The plant according to claim 16, wherein the outlet for the treated purge stream is connected to a recycle flow line to the ammonia synthesis loop.

21. The plant according to claim 16, wherein the outlet for the treated purge stream is connected to a vent and/or to a unit for Ar recovery.

22. A method of modifying an ammonia synthesis plant comprising a water electrolysis unit to produce a $H_2$ stream; an ammonia synthesis loop for reacting said $H_2$ with $N_2$ feed and having an outlet for a gaseous purge stream; wherein the method comprises: providing the plant with a section comprising a scrubber and a membrane separation unit for subjecting said purge stream to a treatment at a pressure of 10-70 bar(a) comprising scrubbing in the scrubber and membrane separation in the membrane separation unit to remove at least a part of the $NH_3$ and at least part of the $H_2$ from the purge gas stream, to provide a treated purge stream, a gaseous stream comprising $H_2$ and a liquid stream, wherein the membrane separation unit comprises a hydrogen-selective membrane, a permeate side compartment and a retentate side compartment, and a supply for a sweep gas to the permeate side compartment; and a flow line for recycling the gaseous stream in part or entirely to the ammonia synthesis loop, wherein the ammonia synthesis plant comprises a flash vessel for flashing a high pressure $NH_3$ liquid stream from the ammonia synthesis loop, which flash vessel has a gas outlet and a liquid outlet, wherein said gas outlet is connected to an ejector provided in the flow line for the purge stream from the synthesis loop to said treatment section.

* * * * *